F. C. ANGWIN.
MERRY-GO-ROUND.
APPLICATION FILED NOV. 26, 1909.

963,495.

Patented July 5, 1910.
4 SHEETS—SHEET 3.

WITNESSES
G. Robert Thomas
M. Marshall

INVENTOR
Frank C. Angwin
BY
Munn & Co
ATTORNEYS

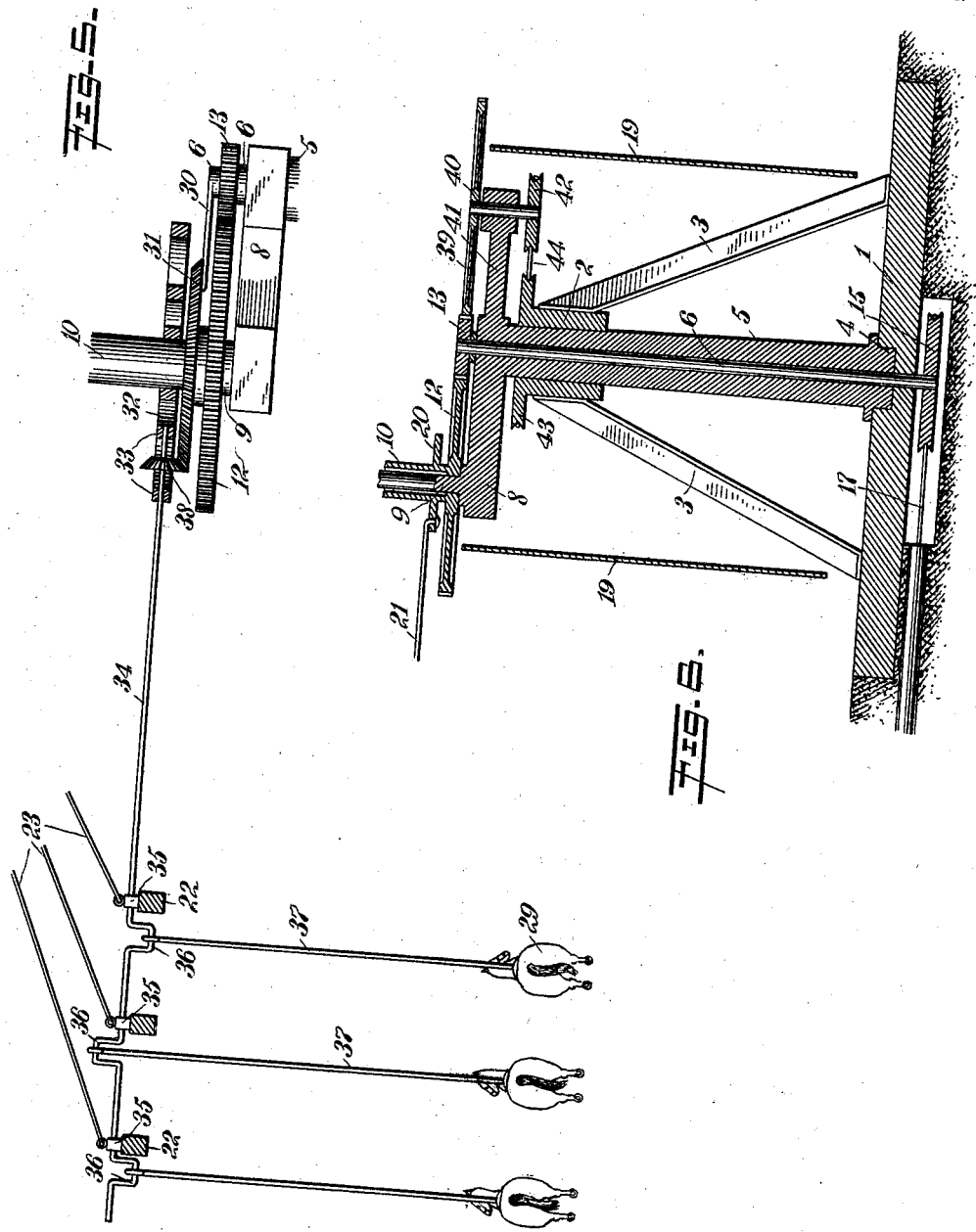

UNITED STATES PATENT OFFICE.

FRANK CECIL ANGWIN, OF PARKVILLE, VICTORIA, AUSTRALIA.

MERRY-GO-ROUND.

963,495.  Specification of Letters Patent.  Patented July 5, 1910.

Application filed November 26, 1909. Serial No. 529,914.

*To all whom it may concern:*

Be it known that I, FRANK C. ANGWIN, a subject of the King of Great Britain, and a resident of Parkville, in the Colony of Victoria, Australia, have invented a new and Improved Merry-Go-Round, of which the following is a full, clear, and exact description.

My invention relates to merry-go-rounds, and it has for its object to provide one with means which are adapted for moving in a circle, around the axis of which the annular frame travels.

Still another object of the invention is to provide means by which the figures, which are supported by the annular frame, may be moved relatively thereto.

Still other objects of the invention will appear in the following complete description.

In this specification I will describe the preferred form of my invention, it being understood that the scope of the invention is defined in the appended claims.

Reference is to be had to the accompanying drawings forming a part of this specification in which similar characters of reference indicate corresponding parts in all the views.

Figure 1:
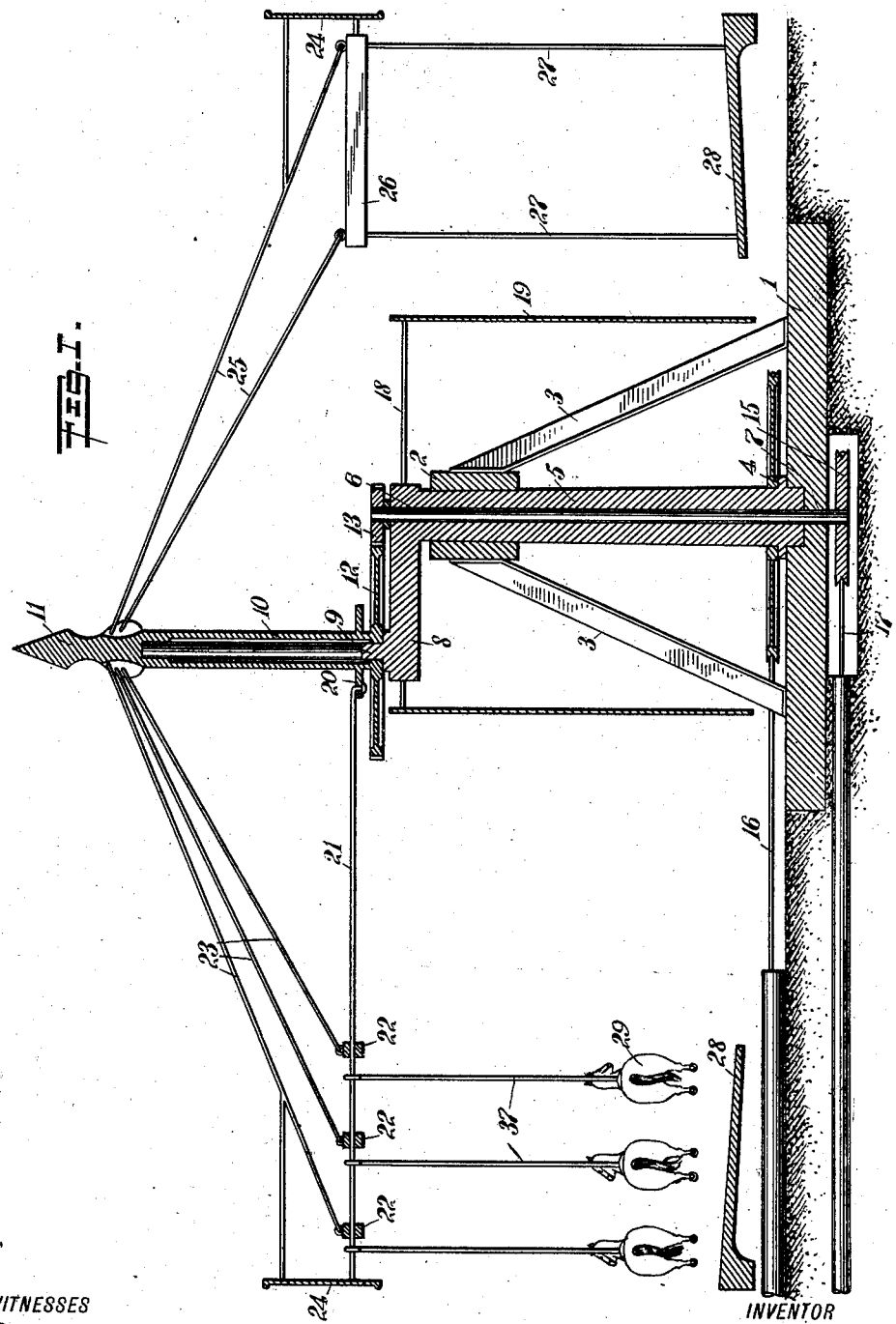
Figure 2:
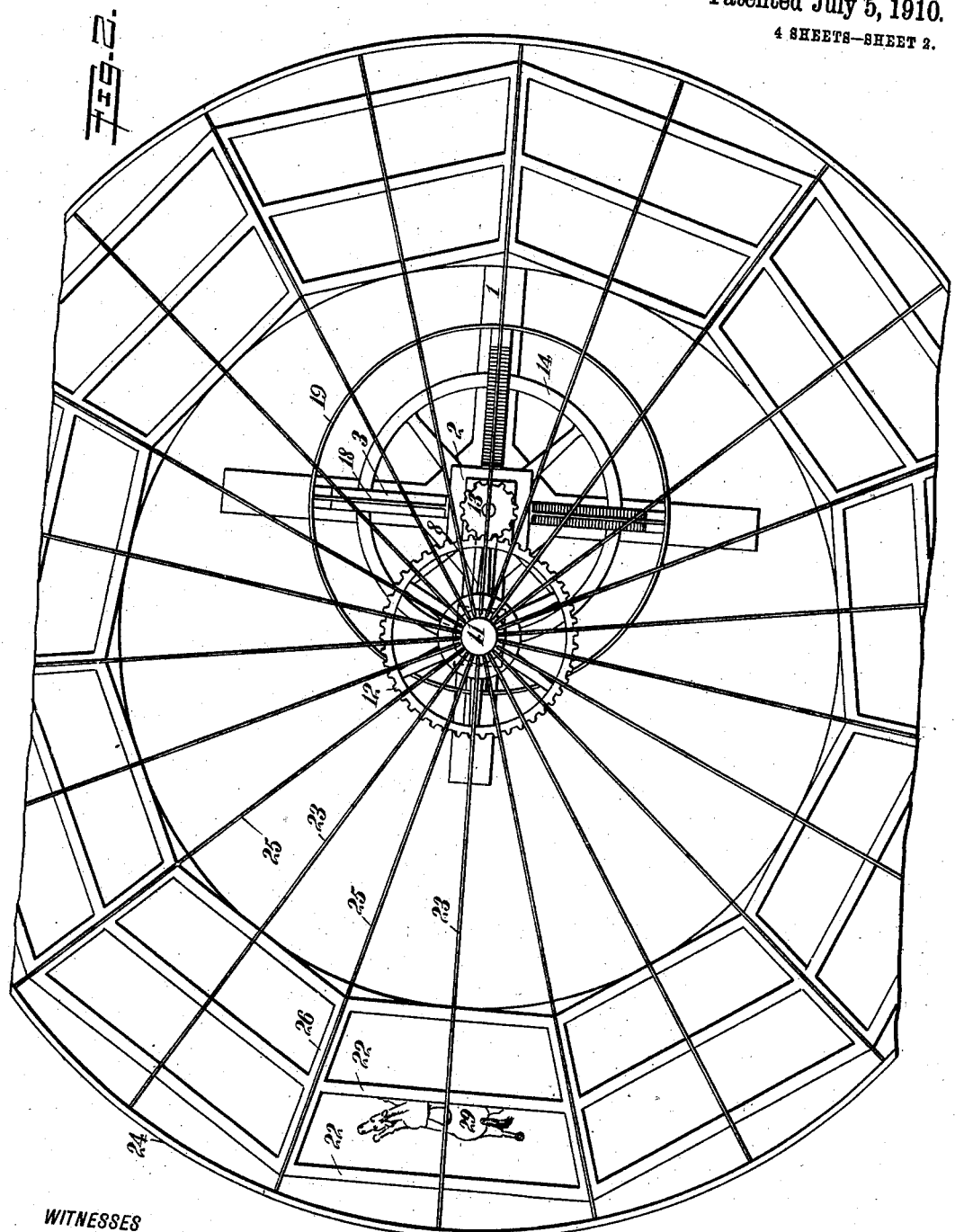
Figure 3:
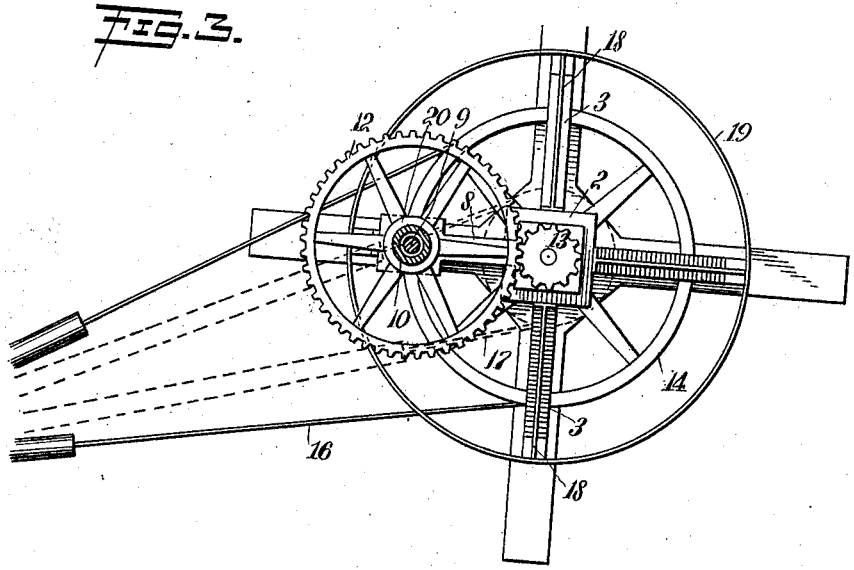
Figure 4:
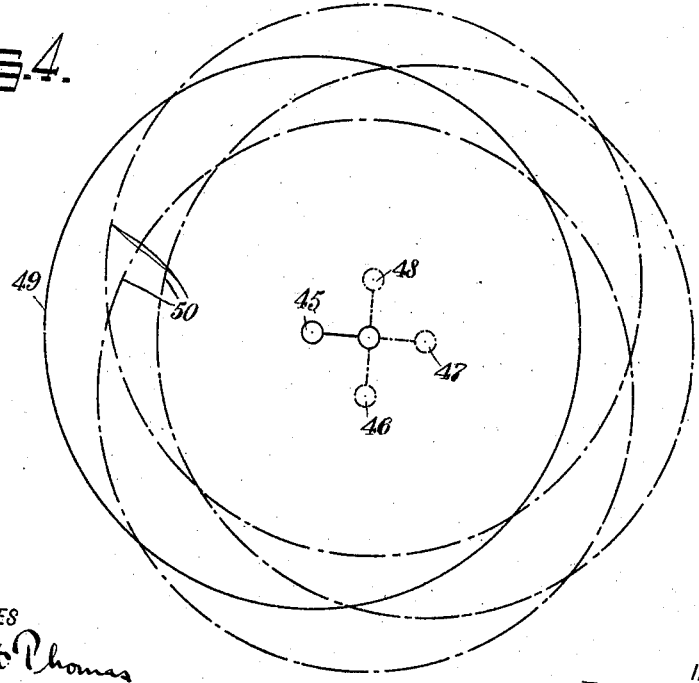

Figure 1 is a sectional elevation of the invention; Fig. 2 is a plan view thereof; Fig. 3 is a plan view showing the gearing with the bolts by which the gearing is operated; Fig. 4 is a diagrammatic view showing the axes and the paths of travel of the periphery of the frame during the operation of the machine; Fig. 5 is a fragmentary view showing means adapted for moving the figures carried by the frame relatively thereto, during the operation of the machine; and Fig. 6 is a modification of the invention showing means by which the shaft disposed in the hollow shaft is adapted to rotate the hollow shaft in an opposite direction to its own movement.

By referring to the drawings it will be seen that a base 1 is provided, a bearing 2 being supported above the base 1 by braces 3. There is a bearing 4 in the base 1 in alinement with the bearing 2, and in these bearings 2 and 4 there is disposed a hollow shaft 5 in which is disposed a shaft 6, the shaft 6 being journaled in the bearing 7 in the base 1. To the hollow shaft 5 is secured an arm 8 having a pin 9 on which is mounted a sleeve 10 with an ornamental head 11. To the sleeve 10 is secured a gear wheel 12, which meshes with a gear wheel 13 secured to the shaft 6. A pulley 14 is secured to the hollow shaft 5, and a pulley 15 is secured to the shaft 6, belts 16 and 17 being provided to respectively engage the pulleys 14 and 15 by which means the hollow shaft 5 and the shaft 6 are rotated. As will be well understood, these two shafts 5 and 6 may be rotated in the same or in opposite directions.

Radially disposed rods 18 extend from the hollow shaft 5. To these rods 18 are secured an annular screen 19, which is adapted for inclosing the central working mechanism. A collar 20 is secured to the sleeve 10 above the gear wheel 12, and to this collar 20 are secured radially disposed supporting rods 21, which are disposed in bearings 22 supported by rods 23 connected to the top of the sleeve 10. The outer terminals of the rods 21 are secured to an annular member 24, which assists in holding the rods 21 in their relative positions, and also acts as a brace. The rods 21 and 23 are disposed in groups at a distance from each other, there being between each guard two rods 25, which are secured to the sleeve 10 near its top, and to opposite ends of a frame member 26, this frame member 26 being also connected with the annular frame member 24. The rods 27 connect the frame member 26 and the annular platform 28 disposed under the horses or other figures 29, the said annular platform 28 being supported by the said rods 27.

In Fig. 5 of the drawings, I have provided means in connection with the mechanism just described adapted for moving the figures relatively to the frame members by horses relatively to the frame members by which they are carried. To obtain this result an arm 30 is secured to the shaft 6, and to this arm 30 is secured a bevel gear wheel 31 through which the sleeve 10 extends. In this construction the collar 20 is dispensed with, and another collar 32 is substituted, this collar 32 being secured to the sleeve 10 and having bearings 33 in which are journaled radially disposed rods 34, which are substituted for the rods 21, these rods 34 being journaled in bearings 35 supported by the rods 23. These rods 34 have cranks 36 therein to which are pivoted rods 37 which support the animals 29. When this attachment is used the bevel gear wheels 38, secured to the rods or shafts 34, will engage the bevel gear wheel 31 so that the rods 34 are rotated as the device is operated, the bevel gear wheel 31 being prevented from rotating relatively to the shaft 6 by means of the arm 30 secured to the shaft 6.

In the modification shown in Fig. 6 of the drawings, when the shaft 6 is connected with the pulley, the gear wheel 13 is secured to the shaft 6 meshing not only with the gear wheel 12 on the sleeve 10, but also meshing with the gear wheel 39 secured to the shaft 40 journaled in another arm 41 secured to the hollow shaft 5, a belt 44 being provided which connects the pulleys 42 and 43 by which means the shaft 6 is adapted to rotate the hollow shaft 5 as well as to rotate the sleeve 10.

In the operation of the device, the shafts 5 and 6 may be rotated in the same direction at the same or at different speeds, or in opposite directions.

In Fig. 4 of the drawings, the Figs. 45, 46, 47 and 48 indicate the successive positions of the pin 9 around which the sleeve 10 carrying the several members rotates, the circles 49 and 50 indicating the path of the annular frame member 24 as the pin 9 moves to the several positions.

In the attachment shown in Fig. 5 of the drawings the animals or other figures 29 are not only moved around a center, the center of which is continuously changing, but they are also moved relatively to the frame by which they are carried.

Having thus described my invention I claim as new and desire to secure by Letters Patent:

1. In a merry-go-round, a standard, an arm pivoted thereto, a frame pivoted to the arm, means adapted for rotating the arm on its pivot, and means adapted for rotating the frame relatively to the arm.

2. In a merry-go-round, a standard, an arm pivoted thereto, a frame pivoted to the arm, a shaft journaled in the frame, a gear wheel secured to the shaft, means adapted for engaging the gear wheel to rotate the shaft, means adapted for rotating the arm on its pivot, and means adapted for rotating the frame relatively to the arm.

3. In a merry-go-round, a standard, an arm pivoted thereto, a frame pivoted to the arm, a shaft journaled in the frame, a gear wheel secured to the shaft, and a gear wheel mounted to rotate with the arm with which the first mentioned gear wheel meshes.

4. In a merry-go-round, a bearing, a hollow shaft journaled in the bearing, an arm secured to the hollow shaft, a frame pivoted to the arm, a shaft disposed within the hollow shaft, and means by which the last mentioned shaft is adapted for rotating the frame relatively to the arm.

5. In a merry-go-round, a bearing, a hollow shaft journaled in the bearing, an arm secured to the hollow shaft, a frame pivoted to the arm, a shaft disposed within the hollow shaft, and a gearing by which the last mentioned shaft is adapted for rotating the frame relatively to the arm.

6. In a merry-go-round, a bearing, a hollow shaft, journaled in the bearing, an arm secured to the hollow shaft, a frame pivoted to the arm, a shaft disposed within the hollow shaft, a gearing by which the last mentioned shaft is adapted for rotating the frame relatively to the arm, pulleys on the shafts respectively, and belts disposed on the pulleys by which means the shafts are adapted to be rotated.

7. In a merry-go-round, a standard, a bearing therein, a hollow shaft journaled in the bearing, a shaft disposed in the hollow shaft, an arm secured to one of the shafts, a frame pivoted to the arm, and a gearing connecting the frame with the other shaft.

8. In a merry-go-round, a standard having a bearing, a hollow shaft journaled in the bearing, a shaft disposed in the hollow shaft, an arm secured to one of the shafts, a pivot on the arm, a sleeve mounted on the pivot, rods extending from the sleeve, and a gearing connecting the sleeve with the other shaft.

9. In a merry-go-round, a standard having a bearing, a hollow shaft journaled in the bearing, a shaft disposed in the hollow shaft, an arm secured to one of the shafts, a pivot on the arm, a sleeve mounted on the pivot, rods extending from the sleeve, means for carrying passengers supported by the rods, gearing connecting the sleeve with the other shaft, pulleys secured to the shaft and to the hollow shaft respectively, and belts mounted on the pulleys.

10. In a merry-go-round, a standard, a bearing therein, a hollow shaft journaled in the bearing, a shaft disposed in the hollow shaft, an arm secured to one of the shafts, a frame pivoted to the arm, a gearing connecting the frame with the other shaft, and an annular screen mounted on the hollow shaft.

11. In a merry-go-round, a standard having a bearing, a hollow shaft journaled in the bearing, a shaft disposed in the hollow shaft, an arm secured to one of the shafts, a frame pivoted to the arm, a shaft journaled in the frame, means adapted for moving the arm for rotating the third mentioned shaft, and means adapted for rotating the two first mentioned shafts.

12. In a merry-go-round, a standard having a bearing, a hollow shaft journaled in the bearing, a shaft disposed in the hollow shaft, an arm secured to one of the said two shafts, a frame pivoted to the arm, a shaft journaled in the frame, a gear wheel on the last-mentioned shaft and a gear wheel meshing with the said gear wheel secured to move with the arm.

13. In a merry-go-round, a standard having a bearing, a hollow shaft journaled in the bearing, a shaft disposed in the hollow shaft, an arm secured to one of the said two shafts, a frame pivoted to the arm, a shaft journaled in the frame, a gear wheel on the last mentioned shaft, a gear wheel meshing with the said gear wheel secured to move with the arm, a gear wheel on the frame, and a gear wheel meshing therewith which is secured to the other of the said two shafts.

14. In a merry-go-round, a standard having a bearing, a hollow shaft journaled in the bearing, a shaft disposed in the hollow shaft, an arm secured to one of the said two shafts, a frame pivoted to the arm, a shaft journaled in the frame, a gear wheel on the last-mentioned shaft, a gear wheel meshing with the said gear wheel secured to move with the arm, cranks on the shaft which is journaled in the frame, means for carrrying passengers, and links connecting the said means with the said cranks.

In testimony whereof I have signed my name to this specification in the presence of two subscribing witnesses.

FRANK CECIL ANGWIN.

Witnesses:
WILLIAM ARMSTRONG,
ANNIE EDWARDS.